US007570842B2

(12) United States Patent
Suenaga et al.

(10) Patent No.: US 7,570,842 B2
(45) Date of Patent: Aug. 4, 2009

(54) OCR APPARATUS AND OCR RESULT VERIFICATION METHOD

(75) Inventors: Yoshiko Suenaga, Kanagawa-ken (JP); Hiroki Miyachi, Kanagawa-ken (JP); Kouichi Mase, Chiba-Ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 594 days.

(21) Appl. No.: 11/289,950

(22) Filed: Nov. 29, 2005

(65) Prior Publication Data

US 2006/0210197 A1    Sep. 21, 2006

(30) Foreign Application Priority Data

Mar. 15, 2005    (JP)    ............................. 2005-072813

(51) Int. Cl.
*G06K 7/00*    (2006.01)
*G06K 9/20*    (2006.01)
*G06K 7/10*    (2006.01)
*G06K 9/72*    (2006.01)
*H04N 1/04*    (2006.01)

(52) U.S. Cl. ...................... 382/321; 382/229; 382/312; 358/474

(58) Field of Classification Search ................ 382/321, 382/312, 229; 358/474
See application file for complete search history.

(56) References Cited

U.S. PATENT DOCUMENTS 5,845,143 A * 12/1998 Yamauchi et al. ............. 704/2
5,912,986 A *  6/1999 Shustorovich ............ 382/156
6,587,599 B1 *  7/2003 Huang ...................... 382/284
6,628,808 B1 *  9/2003 Bach et al. ................ 382/115
6,738,519 B1 *  5/2004 Nishiwaki .................. 382/228
6,965,862 B2 * 11/2005 Schuller .................... 704/258

(Continued)

FOREIGN PATENT DOCUMENTS

JP    2000-10755    1/2000

OTHER PUBLICATIONS

Lasko et al. "Approximate String Matching Algorithms for Limited Vocabulary OCR Ouput Correction" U.S. National Library of Medicine—Communication Engineering Branch—Mar. 6, 2002, pp. 1-12.*

(Continued)

*Primary Examiner*—Andrew W Johns
*Assistant Examiner*—Mia M Thomas
(74) *Attorney, Agent, or Firm*—SoCal IP Law Group LLP; Steven C. Sereboff; John E. Gunther

(57) ABSTRACT

An OCR apparatus includes an operation unit configured to receive an input operation such as specification of an area to be verified, a display unit configured to visually present information, a scanner unit configured to convert character information provided on a document into image information, an OCR-processing unit configured to generate new character information by adding information about the result of evaluating OCR accuracy to character information obtained by subjecting the image information to OCR processing, a sound-conversion unit configured to convert the new character information into sound information adapted to evaluate the accuracy of the OCR result, a sound-output unit configured to output the sound based on sound information, and a control unit 17 configured to control each of the above-described units.

11 Claims, 2 Drawing Sheets

U.S. PATENT DOCUMENTS

| | | | |
|---|---|---|---|
| 7,428,569 B1 * | 9/2008 | Fujihara | 709/201 |
| 7,477,783 B2 * | 1/2009 | Nakayama | 382/173 |
| 2002/0051575 A1 * | 5/2002 | Myers et al. | 382/202 |
| 2002/0152169 A1 * | 10/2002 | Dutta et al. | 705/45 |
| 2003/0021477 A1 * | 1/2003 | Sommer et al. | 382/181 |
| 2003/0050803 A1 * | 3/2003 | Marchosky | 705/3 |
| 2003/0195749 A1 * | 10/2003 | Schuller | 704/258 |
| 2004/0118920 A1 * | 6/2004 | He | 235/454 |
| 2004/0194026 A1 * | 9/2004 | Barrus et al. | 715/515 |
| 2005/0041887 A1 * | 2/2005 | Thomas et al. | 382/313 |
| 2006/0120629 A1 * | 6/2006 | Myers et al. | 382/321 |

OTHER PUBLICATIONS

Suenaga, Yoshiko, Pending U.S. Appl. No. 11/290,091, filed Nov. 29, 2005.

* cited by examiner

OCR APPARATUS AND OCR RESULT VERIFICATION METHOD

BACKGROUND OF THE INVENTION

1. Field of the Invention

The present invention relates to an optical-character-recognition (which will be referred to as "OCR", hereinafter) apparatus and a method for verifying the result of OCR for a specific part, and particularly relates to an OCR apparatus and an OCR result verification method that are adapted to reduce the load of verifying the result of OCR.

2. Description of the Related Art

According to known OCR apparatuses and OCR methods, as disclosed in Japanese Unexamined Patent Application Publication No. 2000-10755, for example, information about the result of OCR can be transmitted, as a sound. Therefore, a user can verify the OCR result based on the output sound.

Although the rate at which OCR apparatuses in recent years recognize a character becomes considerably high, the rate is not perfect. Therefore, the user has to verify the OCR result.

According to the above-described OCR apparatuses and OCR result verification methods, the user can verify the result of OCR processing by recognizing output sound. However, if a hardly-recognizable character or a number including 1, 7, and so forth is erroneously recognized, the user often misses the error. Further, the above-described OCR apparatuses do not determine the accuracy (matching) of OCR processing. Therefore, the user does not know how accurately the number 7 and/or 1 is recognized. Therefore, if the accuracy of OCR processing is so low that "70,000 yen" is erroneously recognized, as "10,000 yen", the user hardly notices the error.

There have been provided OCR apparatuses that can present original data to be OCR-processed and OCR data obtained by OCR processing at the same time, so as to verify a result of the OCR processing. In that case, a user verifies the result of recognition by comparing the original data to the OCR data, where the original data and the OCR data are comparatively displayed on a display.

However, even though the user compares the original data to the OCR data, where the original data and the OCR data are comparatively displayed, the OCR recognition rate is not perfect. That is to say, the total number of erroneously recognized parts is not zero, though it is small. Therefore, the comparison requires attention when verifying whether or not there are erroneously recognized parts and puts a heavy load on the user's eyes, thus increasing the load of verification on the user.

SUMMARY OF THE INVENTION

In order to solve the aforementioned problems, the present invention provides an OCR apparatus and an OCR result verification method that are adapted to reduce the load of verifying an OCR result obtained by performing OCR processing.

Therefore, an OCR apparatus according to an aspect of the present invention includes an operation unit configured to receive an input operation, a display unit configured to visually present information, an optical character recognition unit configured to generate first character information by adding information about a result of evaluating accuracy of optical character recognition to second character information, the second character information being obtained by subjecting image information stored in a readable manner to the optical character recognition, a character-to-sound conversion unit configured to generate sound information adapted to evaluate accuracy of the optical character recognition based on the first character information, a sound output unit configured to output the sound based on sound information, and a control unit configured to control the operation unit, the display unit, the optical character recognition unit, the character-to-sound conversion unit, and the sound output unit.

An optical character recognition result verification method according to another aspect of the present invention is adapted to generate first character information by adding information about a result of evaluating accuracy of optical-character recognition to second character information obtained by performing the optical-character recognition, generate sound information adapted to evaluate the accuracy of a result of the optical-character recognition based on the first character information, and output the sound on the basis of the sound information.

An optical-character-recognition-result verification method according to another embodiment of another aspect of the present invention includes the steps of recognizing at least one first verification object for which a result of optical-character recognition is verified, calculating an optical-character-recognition matching rate, where the optical-character-recognition matching rate denotes an average of optical-character-recognition matching rates obtained for a second verification object provided on the n-th page of the first verification object, and performing sound conversion and sound output, so as to output the sound corresponding to details on the optical-character recognition and the average matching rate that are obtained for the second verification object.

According to the above-described optical-character-recognition apparatus and the optical-character-recognition-result verification methods, a character provided on a document subjected to scanning is read aloud. Therefore, a user can verify the result of optical-character recognition only by seeing the document subjected to scanning, which may reduce a strain on the user and a load on the user's eyes when the user verifies the optical-character-recognition result.

Further, in the event that the optical-character recognition is performed, matching-reference information and document information are obtained. Therefore, the optical-character-recognition result can be externally output as the sound corresponding to the accuracy of the optical-character recognition. Subsequently, the user can determine the optical-character-recognition result including the precision (accuracy) of the optical-character recognition according to variations in the sound.

Furthermore, when verifying documents of the same type (fixed format), a predetermined area of a document that comes first is specified, so that the areas corresponding to the specified area of the other documents can be automatically verified in sequence. Therefore, it becomes possible to take the load of verification off the user when the user verifies many documents in a fixed format.

DESCRIPTION OF THE PREFERRED EMBODIMENTS

OCR apparatuses and OCR-result verification methods according to embodiments of the present invention will be described with reference to the attached drawings.

Figure 1:
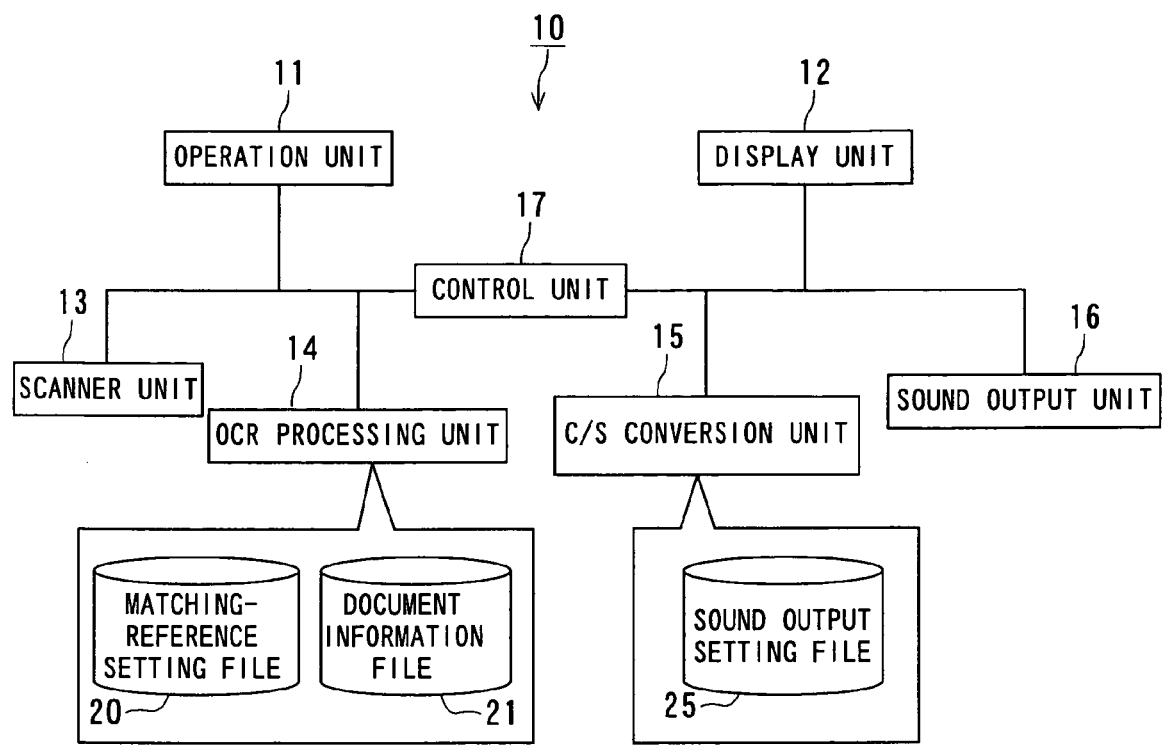
FIG. 1 schematically shows a basic functional configuration of an OCR apparatus according to an embodiment of the present invention.

FIG. 1 schematically illustrates a basic functional configuration of an OCR apparatus 10 according to an embodiment of the present invention.

The OCR apparatus 10 includes an operation unit 11 configured to receive (accept) an operation (hereinafter referred to as input-operation) input from a user, such as operation specifying an area to be verified. The OCR apparatus 10 further includes a display unit 12 configured to visually present information to the user, a scanner unit 13 configured to convert information, including at least character information, provided on an original document (hereinafter simply referred to as document) into image information, an OCR-processing unit 14 configured to generate new character information by adding information about the result of evaluating the accuracy of OCR processing to character information obtained by subjecting the image information to the OCR processing, a character-to-sound conversion unit 15 (hereinafter referred to as C/S conversion unit) configured to convert the new character information into sound information adapted to evaluate the accuracy of the OCR result, a sound-output unit 16 configured to output the sound based on sound information, and a control unit 17 configured to control the operation unit 11, the display unit 12, the scanner unit 13, OCR-processing unit 14, C/S conversion unit 15 and sound-output unit 16.

The operation unit 11 has a function of accepting input-operations input from user such as an operation for requesting to start scanning (scan start requesting operation), an operation for specifying a verification area (verification area specifying operation), or the like and generating input-operation information on the basis of the user input operation. The input-operation information generated by the operation unit 11 is transmitted to the control unit 17.

The display unit 12 is configured to receive display information transmitted from the control unit 17. Further, the display unit 12 is configured to produce a display image based on the transmitted display information. Therefore, upon receiving the display information, the display unit 12 can produce a display image based on the display information and display the display image.

In an actual system, it is not necessary to provide each of the operation unit 11 and the display unit 12 as an independent processing unit. That is to say, the operation unit 11 and the display unit 12 may be provided as operation-and-display unit integrated the operation unit 11 and the display unit 12.

The scanner unit 13 has a function of converting information (hereinafter referred to as document information) provided on a document (a sheet of paper) into image information. Since the scanner unit 13 is configured to convert document information into image information, upon completion of converting document information into the image information, the scanner unit 13 can transmit the image information obtained by conversion to the control unit 17.

The OCR-processing unit 14 has an OCR function adapted to obtain character information based on image information. That is to say, the OCR-processing unit 14 can obtain character information based on image information by performing OCR processing.

The OCR-processing unit 14 has a function of digitizing information about how accurately a character is recognized by OCR processing (hereinafter referred to as an OCR-accuracy-calculation function). More specifically, the OCR-accuracy-calculation function is a function of verifying a character type functioning as an OCR reference (hereinafter referred to as a basic character) against an OCR-processed character and calculating a matching rate indicating the extent to which the basic character agrees with the OCR-processed character. Therefore, the OCR-processing unit 14 can calculate the matching rate for each of OCR-processed characters. In other words, the OCR-processing unit 14 can evaluate the OCR precision. In addition, the OCR-processing unit 14 can calculate the average of matching rates of characters included in a predetermined specific area based on the matching rate of each of the characters.

Further, the OCR-processing unit 14 has a function of recognizing the matching rate. Therefore, when OCR processing is performed in advance and only verification of the OCR-processing result is performed later, the OCR-processing unit 14 can obtain information about the matching rate of each character (hereinafter referred to as matching-rate information) and calculate the average of matching rates of the characters included in the predetermined specific area.

On the other hand, the OCR-processing unit 14 obtains matching-reference information and document information when verifying the OCR-processing result. Herein, the term "matching-reference information" denotes information used for determining the type of processing to be performed based on a range in which the matching rate falls. Therefore, the OCR-processing unit 14 can perform predetermined processing that had been set according to the numerical value of the matching rate, such as a step of generating new character information. The matching-reference information is exemplarily shown, as in Table 1 that will be described later.

The term "document information" denotes information regarding the form of a document to be scanned, such as an invoice, an estimate, a bill, and so forth. More specifically, the term "document information" denotes information regarding association of a document type with items. For example, the document information shows that a date field is provided at the upper right of the invoice and an amount filed is provided at the center thereof. The upper right is determined with reference to the orientation along which the user usually sees the document. The above-described configuration for determining the upper right or the like will be the same in the following description. Subsequently, once the document information is obtained, it becomes possible to determine to which item of which document (e.g., an amount disclosed in the invoice) a specified verification area corresponds.

The matching-reference information and the document information are stored in an accessible data-storage area including, e.g., a predetermined data-storage area provided in the OCR apparatus 10 or a data-storage area provided in an external device (not shown), as electronic data including a matching-reference setting file 20, a document-information file 21, and so forth. Therefore, the OCR-processing unit 14 can obtain the matching-reference information and the document information required to verify the OCR-processing result by referring to the matching-reference-setting file 20 and the document-information file 21.

Furthermore, the OCR-processing unit 14 has a function (hereinafter, referred to as verification-object-page-number counting function) of counting and recognizing the number of entire OCR-processed pages to be scanned. The OCR-processing unit 14 has also a function (hereinafter, referred to as current-page counting function) counting and recognizing the number of verified pages when the OCR-processing result is verified. For example, the OCR-processing unit 14 can store information regarding the value of verification-object-page number m (wherein m denotes a predetermined natural number) and information regarding the value of current page n (wherein n denotes a predetermined natural number lower than m) in a memory (not shown).

Since the OCR-processing unit 14 can read the value of verification-object-page number m and that of current page n that are stored in the memory, the OCR-processing unit 14 can know how many pages are to be verified and/or the number of page on the basis of the value of verification-object-page number m and that of current page n that are read.

The C/S conversion unit 15 has a character-to-sound conversion function adapted to convert character information such as text data into sound information such as sound data. Therefore, the C/S conversion unit 15 can convert acquired character information into sound information.

Further, the C/S conversion unit 15 acquires sound-setting information for performing the character-to-sound conversion processing. Herein, the term "sound-setting information" denotes information regarding the settings on a sound to be output. More specifically, the sound-setting information denotes information about the types of sound to be output and making a selection from the sound types. For example, the sound types may include the voice of an adult male (with a low frequency) and that of an adult female (with a high frequency). In addition, the information about making the sound-type selection indicates which of the sound types is selected.

The sound-setting information is stored in an accessible data-storage area including a predetermined data-storage area provided in the OCR apparatus 10, a data-storage area provided in an external device (not shown), and so forth, as electronic information such as a sound-setting file 25. The C/S conversion unit 15 can acquire sound-setting information stored in the sound-setting file 25 by referring to the sound-setting file 25.

The sound-output unit 16 has a function of outputting a sound based on sound information including acquired sound data or the like. Therefore, the sound-output unit 16 can output a sound based on sound information converted by the C/S conversion unit 15.

The control unit 17 has a processing-unit control function adapted to control the operation unit 11, the display unit 12, the scanner unit 13, the OCR-processing unit 14, the C/S conversion unit 15, and the sound-output unit 16 so that information can be transmitted and received among the above-described units 11 to 16.

More specifically, the control unit 17 receives input-operation information, generated on the basis of the input-operation input by the user, transmitted from the operation unit 11. Then, the control unit 17 controls the above-described units 11, 12, 13, 14, 15, and 16 according to the details on the input-operation information. At least one of the above-described units 11, 12, 13, 14, 15, and 16 that are controlled by the control unit 17 performs the necessary processing corresponding to the details on the input operation.

Further, when the control unit 17 receives scanned image information transmitted from the scanner unit 13, the control unit 17 transmits the image information to the display unit 12 and the OCR-processing unit 14. Furthermore, when the control unit 17 receives character information transmitted from the OCR-processing unit 14, the control unit 17 transmits the character information to the C/S conversion unit 15. Still further, when the control unit 17 receives sound information transmitted from the C/S conversion unit 15, the control unit 17 transmits the sound information to the sound-output unit 16.

Adding to the above-described processing-unit control function, the control unit 17 has a job-management function adapted to store information about an image that was scanned in the past and information regarding an OCR-processed character, and manage the stored information in a readable state. The job-management function includes a log-generation function so that the matching rate of each of characters is recorded when at least information about OCR-processed characters is stored. For example, information about the above-described matching rate can be stored, as a log (electronic information) including a log file or the like.

Therefore, the user can perform OCR processing by referring not only to information about an image that had just been scanned but also information about an image generated in the past by performing an input operation via the operation 11. After that, the user can verify the result of the above-described OCR processing. Further, the user can refer to the log and acquire information about the matching ratio of each character from information about characters that had been OCR-processed. Therefore, the user can verify the OCR-processing result later on.

Thus, since the above-described OCR apparatus 10 includes the OCR-processing unit 14 configured to acquire matching-reference information, the C/S conversion unit 15, and the sound-output unit 16, the C/S conversion unit 15 can convert character information recognized by the OCR-processing unit 14 into sound information and the sound-output unit 16 can externally output a sound based on the sound information. That is to say, the OCR-apparatus 10 allows reading a character of a document to be scanned aloud.

Therefore, the user can verify the OCR-processing result only by seeing a document to be scanned, which may reduce a strain on the user and a load on the user's eyes when the user verifies the OCR-processing result.

Further, the OCR-processing unit 14 acquires the matching-reference information and the document information upon executing the OCR processing. Therefore, the OCR-apparatus 10 including the OCR-processing unit 14 can output the sound corresponding to the accuracy of the OCR processing at the time when outputting the OCR-processing result. Further, the user can recognize not only the OCR-processing result but also the precision (accuracy) of OCR based on the difference of the sound corresponding to the accuracy of the OCR processing.

Furthermore, in case of verifying documents of the same type (fixed format), a predetermined area of a document that comes first is specified, so that the areas corresponding to the specified area of the other documents can be automatically verified in sequence. Therefore, it becomes possible to reduce the load of verification when the user verifies many documents in a fixed format.

Note that the OCR apparatus 10 may include an interface unit serving as an interface (hereinafter referred to as an I/F) connected to an external device. Further, a server configured to store electronic data, another OCR-processing apparatus, a control computer configured to control a plurality of OCR-processing apparatuses, and so forth may be connected to the I/F unit so that other functions may be added to the OCR apparatus 10.

Further, in the OCR apparatus 10, the OCR-processing unit 14 executes predetermined processing by acquiring the matching-reference-setting information when the OCR-processing result is verified. However, the matching-reference-setting information may not be acquired. That is to say, the matching-reference-setting file 20 may not be required. In the event that the OCR-processing unit 14 does not acquire the matching-reference-setting information when the OCR-processing result is verified, only the character information acquired by the OCR processing is converted sound information and then output sound based on the converted sound information.

Furthermore, in the OCR apparatus 10, the OCR-processing unit 14 acquires the document information when the OCR-processing result is verified. However, the document information may not be acquired. That is to say, the document-information file 21 may not be required. In the event that the OCR-processing unit 14 does not acquire the document information when the OCR-processing result is verified, only the character information acquired by the OCR processing is converted sound information and then output sound based on the converted sound information.

Still further, in the OCR apparatus 10, upon receiving an operation input adapted to specify an area in which the OCR-processing result is verified, the control unit 17 generates display information indicating that the specified verification area should be highlighted and transmits the display information to the display unit 12, so that a highlighted image of the verification area is produced on the display unit 12.

In addition, the OCR apparatus 10 according to another embodiment of the present invention may be configured as described below. Namely, upon receiving the operation input adapted to specify the area in which the OCR-processing result is verified, the control unit 17 transmits the display information indicating that the specified verification area should be highlighted to the display unit 12 in sequence in synchronization with the time where sound information is transmitted from the control unit 17 to the sound-output unit 16, so that the parts corresponding to sentences to be read aloud are highlighted in sequence.

Further, the OCR apparatus 10 according to another embodiment of the present invention may be configured as described below. Namely, upon receiving the operation input adapted to specify the area in which the OCR-processing result is verified, the control unit 17 generates display information indicating that only the specified verification area is shown so that the display unit 12 produces an image only of the verification area.

Next, an OCR-result verification method according to another embodiment of the present invention will be described below.

The above-described OCR-result-verification method is executed (performed) by the above-described OCR apparatus. Namely, the OCR apparatus executes the procedure (hereinafter, referred to as specific-part verification processing procedure) of verifying a specific part, so as to verify the result of OCR processing for a selected area, or the entire area when no part is selected.

Figure 2:
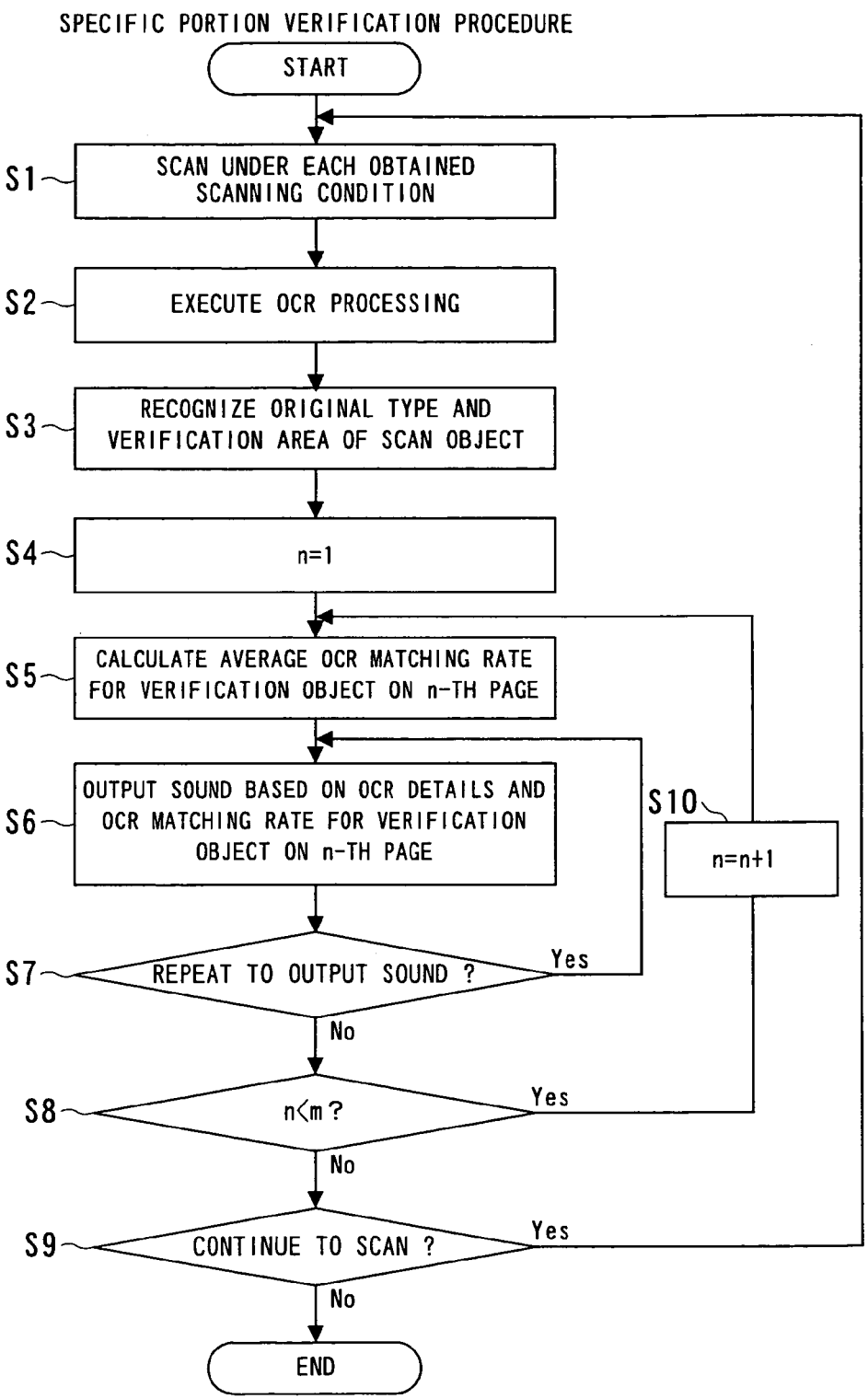
FIG. 2 is a flowchart sequentially illustrating processing procedures of specific-part verification performed by the OCR apparatus.

FIG. 2 is a flowchart sequentially illustrating the specific-part verification processing procedure executed (performed) by the OCR apparatus.

According to FIG. 2, the specific-part verification processing procedure includes the steps of scanning information provided on a document under acquired conditions (step S1), performing OCR processing for image information acquired, at the scanning step (step S2), recognizing an object for which the OCR result is verified (step S3), calculating the average of OCR-matching rates of verification objects provided on the n-th page (step S5), and converting and externally outputting the sound corresponding to the details on the OCR and the average matching rate that are obtained for the verification objects provided on the n-th page (step S6).

According to the above-described specific-part-verification processing procedure, the OCR apparatus 10 starts performing the processing procedures upon receiving a request to perform scanning, where the request is input by the user (START).

First, the scanning step is executed, at step S1. In the scanning step (step S1), the scanner unit 13 acquires scan conditions and performs scanning under the acquired conditions. The scanner unit 13 performs scanning for a document serving as a scan object and transmits image information acquired by the scanning to the control unit 17. Upon the completion of transmitting the image information to the control unit 17, the scanning step is terminated. Then, in step S2, OCR processing step is executed.

In the OCR processing step (step S2), the OCR-processing unit 14 performs OCR processing for the scan-object image information transmitted from the control unit 17 and then recognizes information provided on the scan object, as character information. That is to say, the OCR-processing unit 14 can acquire the character information of the scan object by performing the OCR processing.

When the OCR-processing unit 14 performs OCR processing, at step S2, the OCR-processing unit 14 also calculates the rate of OCR-processed characters that are matched with basic characters that had been stored to OCR-processed characters that are not matched with the basic characters. The calculated matching-rate information for each character is temporarily stored in a memory provided the OCR-processing unit 14 and transmitted to the control unit 17. After the OCR-processing unit 14 performs the OCR processing, calculates the matching rate for each of the OCR-processed characters, temporarily stores information about the calculated matching rate in a memory, and transmits the matching-rate information to the control unit 17, the OCR-processing step is terminated. Then, in step S3, scan-object verification step is executed.

In the scan-object verification step (step S3), the OCR-processing unit 14 acquires the matching-reference information, the document information, and verification-area information, so as to recognize a verification object wherein the result of OCR processing is verified. Herein, the term "verification-area information" denotes information regarding a verification area, specified by the user via the operation unit 11, which includes at least a character recognized by OCR processing.

The verification-area may be specified by specifying a predetermined page of the entire pages of the scan object that had been scanned, specifying a predetermined group of the scan object that had been scanned, specifying the start point and end point of the verification area, and so forth.

Further, in step S3, the OCR-processing unit 14 uses the verification-object-page-number counting function, and then stores information regarding the page number m of the verification object into the memory.

The OCR-processing unit 14 recognizes the verification object wherein the OCR-processing result is verified by acquiring the matching-reference information, the document information, and the verification-area information, and stores the page number m of the verification object, thus finishing the verification-object recognition corresponding to step S3. The flow then proceeds to step S4 so that the OCR-processing unit 14 determines the value of the current page n stored in the memory to be one (where the expression n=1 holds) by using the current-page counting function, so as to count the number of a page that is currently verified, thus terminating the processing corresponding to step S4. The flow then proceeds to step S5 so that the OCR-matching rate is calculated.

In the OCR-matching rate calculating step (step S5), the OCR-matching rate is calculated, the OCR-processing unit 14 calculates the average of OCR matching rates for a verification object provided on the n-th page by using the matching-rate information, thus terminating the OCR-matching-rate calculation. Subsequently, in step S6, character-to-sound conversion (C/S conversion) and sound outputting step are executed.

In C/S conversion and sound outputting step (step S6), first, the OCR-processing unit 14 determines the type of a document based on the document information acquired, at step S3, and recognizes to which item the specified verification area corresponds. For example, when the OCR-processing unit 14 recognizes that the verification area corresponds to an amount (yen) item, new character information is added. The above-described new character information is generated by adding character data "yen" at the end of the character information recognized by the OCR processing.

After the new character information generated based on the document information is added, the OCR-processing unit 14 executes predetermined processing set in advance to the matching-reference-setting file 20 based on the average matching rate that was calculated, at step S5, for the verification object provided on the n-th page and the matching-reference information acquired, at step S3. Example details on the predetermined processing set in advance to the matching-reference-setting file 20 are described in Table 1 shown below.

TABLE 1

| Average Matching Rate [%] | Details on Processing to be executed |
|---|---|
| 0 to 20 | generate character information "unrecognizable" |
| 21 to 50 | Add character information "not certain" at the end of sentence |
| 51 to 80 | Add character information "probably certain" at the end of sentence |
| 81 to 100 | Add character information "certain" at the end of sentence |

According to Table 1, character information "unrecognizable" is generated, where the average matching rate is from 0 to 20%. Where the average matching rate is from 21 to 50%, new character information is generated by adding character information "not certain" to the end of a sentence obtained on the basis of the character information. Where the average matching rate is from 51 to 80%, new character information is generated by adding character information "probably certain" to the end of the sentence obtained on the basis of the character information. Where the average matching rate is from 81 to 100%, new character information is generated by adding character information "certain" to the end of the sentence obtained on the basis of the character information.

The new character information generated by the OCR-processing unit 14 is transmitted to the control unit 17 and further transmitted from the control unit 17 to the C/S conversion unit 15. Upon receiving the new character information, the C/S conversion unit 15 converts the transmitted character information into sound information by using the character-to-sound conversion function. Upon performing the character-to-sound conversion, the C/S conversion unit 15 generates sound information by using the sound of a type selected on the basis of the sound-setting information.

The sound information obtained by the C/S conversion unit 15 by performing the character-to-sound conversion is transmitted to the control unit 17 and further transmitted from the control unit 17 to the sound-output unit 16. Upon receiving the sound information, the sound-output unit 16 externally outputs the sound corresponding to the sound information. Namely, the sound-output unit 16 externally outputs the sound corresponding to the details and average matching rate of the OCR-processed-character information obtained for the verification object provided on the n-th page. Subsequently, the C/S conversion and the sound output step is terminated, and the flow proceeds to step S7.

At step S7, the control unit 17 generates display information used for asking the user whether the sound output at step S6 should be output again or not. Then, the control unit 17 transmits the generated display information to the display unit 12, at step S7. Upon receiving the generated display information, the display unit 12 produces a display image adapted to ask the user whether the sound output at step S6 should be output again or not.

When the operation unit 11 receives an operation input indicating that the sound-output is not performed again, that is to say, where the answer is no, at step S7, the flow proceeds to step S8 so that the OCR-processing unit 14 compares the value of verification-object page number m stored in the memory to that of current page n stored in the memory. Then, where the value n is equivalent to the value m or higher (where the expression n<m does not hold), namely, where the answer is NO, at step S8, the flow proceeds to step S9.

At step S9, the control unit 17 generates display information used for asking the user whether another scan object exists or not, in other words, whether the scanning should be continued or not. Then, the control unit 17 transmits the generated display information to the display unit 12. Upon receiving the generated display information, the display unit 12 produces a display image adapted to ask the user whether the scanning should be continued or not.

In the event that the operation unit 11 receives an operation input indicating that the scanning should not be continued, that is to say, where the answer is NO, at step S9, the processing corresponding to step S9 is terminated, whereby the entire steps of the specific-part verification processing procedure are terminated (END).

When the operation unit 11 receives an operation input indicating that the sound output should be performed again, at step S7, namely, where the answer is YES, at step S7, the flow then proceeds to step S6 so that the processing procedures from step S6 on down are executed.

Further, when the OCR-processing apparatus 14 compares the value m to the value n and the value n is smaller than the value m so that the expression n<m holds, at step S8, that is to say, where the answer is NO, at step S8, the flow proceeds to step S10 so that the OCR-processing unit 14 stores a new value of current page n in the memory, where the new value of current page n is generated by adding one to the current value of current page n. Subsequently, the processing corresponding to step S10 is terminated. Then, the flow returns to step S5 so that the steps corresponding to step S5 on down are executed.

When the operation unit 11 receives an operation input indicating that the scanning should be continued, that is to say, where the answer is YES, at step S9, the flow returns to step S1 so that the steps corresponding to step S1 on down are executed.

Note that, in the C/S conversion and sound output step (step S6), the details on the step S6 that are executed by the OCR-processing unit 14 are not limited to those shown in Table 1. For example, where the average matching rate is low (less than 50%), a male voice may be selected and where the average matching rate is high (50% or more), a female voice may be selected. Namely, the type of a sound may be changed according to the average matching rate.

In the event that the sound type is changed according to the average matching rate, the OCR-processing unit 14 generates sound-selection information indicating which sound should be selected from among sound set in advance. Then, the sound-selection information may be transmitted to the control unit 17 together with the character information recognized by the OCR processing. Upon receiving the character information and the sound-selection information that are transmitted from the control unit 17, the C/S conversion unit 15 performs character information-to-sound information conversion for the character information. By performing the C/S conversion, the C/S conversion unit 15 can select the type of a sound to be output on the basis of the sound-setting information obtained by referring to the sound-setting file 25 and the sound-selection information transmitted from the control unit 17 and then generate sound information.

Further, in the C/S conversion and sound output step (step S6), the OCR-processing unit 14 may generate new character information by adding information about the numerical value of the calculated average-matching rate to the end of a sentence, as character information.

According to FIG. 2, the specific-part-verification processing procedure is sequentially performed, from the scan processing to the OCR-processing-result verification. However, the specific-part verification can be performed for character information obtained in the past by the OCR processing. In that case, after character information (OCR data) to be verified is read, and the steps from step S3 on down of the specific-part-verification processing procedure are executed.

Further, after information about an image scanned in the past is read, the steps from step S2 on down of the specific-part-verification processing procedure may be executed. In that case, an area where the OCR-processing result is verified can be specified by specifying the name of a folder storing an image file, that is, the image information, or the name of the image file.

Furthermore, where the specific-part-verification processing procedure is executed, at least one of the document information and the matching-reference-setting information may not be acquired. Where the document information is not acquired, that is to say, where the document-information file 21 does not exist, the character information corresponding to the item of the document is not added, at step S6. Where the matching-reference-setting information, that is to say, the matching-reference-setting file 20 does not exist, either OCR-processed character information or new character information generated by adding the character information corresponding to the item of the document to the OCR-processed character information is transmitted to the control unit 17, at step S6.

Thus, the OCR-result-verification methods according to the above-described present invention include the steps of verifying a verification object (step S3), calculating the OCR-matching rate (step S5), and C/S converting and outputting a sound (step S6). Accordingly, where the result of OCR processing performed for a verification object verified, at step S3 is verified, the sound corresponding to an average matching rate is calculated, at step S5 is output, at step S6.

Therefore, a user can verify the OCR-processing result only by seeing a document subjected to scanning and determine the precision (accuracy) of the OCR-processing result based on variations in the sound. In addition, the OCR-result-verification methods may reduce a strain on the user and a load on the user's eyes when the user verifies the OCR-processing result.

Further, when verifying the documents of the same type (fixed format), the predetermined area of the document that comes first is specified, and the areas corresponding to the specified area of the other documents are automatically verified in sequence. Therefore, it becomes possible to reduce the load of verification when the user verifies many documents in a fixed format.

Furthermore, the above-described OCR-result-verification methods allow asking the user whether or not the sound should be output again. Therefore, the user neither misses nor misunderstands the sound.

What is claimed is:

1. An optical-character-recognition apparatus comprising:
    an operation unit configured to receive an input operation;
    a display unit configured to visually present information;
    an optical-character-recognition unit configured to
        generate second character information by subjecting image information stored in a readable manner to optical-character recognition,
        determine a matching rate for each character in the second character information, the matching rate indicating the extent to which each character matches a corresponding stored reference character,
        calculate an average matching rate by averaging the matching rates for all characters in the second character information, and
        generate first character information by adding additional information to the second character information, the additional information based on the average matching rate;
    a sound-conversion unit configured to generate sound information based on the first character information;
    a sound-output unit configured to output sound based on the sound information; and
    a control unit configured to control the operation unit, the display unit, the optical-character-recognition unit, the sound-conversion unit, and the sound-output unit.

2. The optical-character-recognition apparatus according to claim 1, further comprising a scanner unit configured to convert a document into the image information.

3. The optical-character-recognition apparatus according to claim 1, wherein
    the optical-character-recognition unit is further adapted to acquire information regarding a document type and to generate the first character information for a specified verification area.

4. The optical-character-recognition apparatus according to claim 3, wherein said control unit is configured to control the display unit so that the verification area is highlighted.

5. The optical-character-recognition apparatus according to claim 4, wherein said control unit is configured to control the display unit and the sound-output unit so that the verification area is highlighted in synchronization with the time when the sound is output.

6. The optical-character-recognition apparatus according to claim 3, wherein said control unit is configured to control the display unit so that only the verification area is displayed.

7. The optical-character-recognition apparatus according to claim 1, wherein the average matching rate is determined on a scale of 0% to 100%, which is divided into a plurality of ranges, each range associated with a corresponding one of a plurality of third character information, and the added information is selected from the plurality of third character information based on the average matching rate.

8. The optical-character-recognition apparatus according to claim 1, wherein the optical-character-recognition unit is configured to select a type of sound to be output based on the average matching rate.

9. An optical-character-recognition-result verification method adapted to:

generate second character information by subjecting image information stored in a readable manner to the optical-character recognition, determine a matching rate for each character in the second character information, the matching rate indicating the extent to which the character matches a corresponding stored reference character, calculate an average matching rate by averaging the matching rates for all characters in the second character information, and generate first character information by adding additional information to the second character information, the additional information based on the average matching rate;

generate sound information based on the first character information; and output a sound based on the sound information.

10. An optical-character-recognition-result verification method comprising the steps of:

recognizing at least one verification object for which a result of optical-character recognition is to be verified;

determining a matching rate for each optically-recognized character in the verification object, the matching rate indicating the extent to which the optically-recognized character matches a corresponding stored reference character;

calculating an average matching rate by averaging the matching rates for all optically-recognized characters in the verification object; and performing sound conversion and sound output, so as to output a sound corresponding to details on the optical-character recognition and the average matching rate that are obtained for the verification object.

11. The optical-character-recognition-result verification method according to claim 10, further comprising the steps of:

scanning data under acquired conditions; and performing the optical-character recognition for image information acquired by the scanning.

* * * * *